(12) United States Patent
Hirose

(10) Patent No.: US 9,277,084 B2
(45) Date of Patent: Mar. 1, 2016

(54) DATA PROCESSING DEVICE, DATA PROCESSING SYSTEM, AND DATA PROCESSING METHOD

(71) Applicant: Mitsuhiko Hirose, Tokyo (JP)

(72) Inventor: Mitsuhiko Hirose, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 14/609,531

(22) Filed: Jan. 30, 2015

(65) Prior Publication Data

US 2015/0237231 A1 Aug. 20, 2015

(30) Foreign Application Priority Data

Feb. 17, 2014 (JP) ................. 2014-027113

(51) Int. Cl.
*H04N 1/00* (2006.01)
*H04N 1/21* (2006.01)

(52) U.S. Cl.
CPC ............. *H04N 1/21* (2013.01); *H04N 1/0083* (2013.01); *H04N 1/00204* (2013.01); *H04N 1/00278* (2013.01); *H04N 2201/0081* (2013.01)

(58) Field of Classification Search
USPC ............ 358/1.15, 400, 468, 1.18, 1.16, 442
See application file for complete search history.

(56) References Cited

U.S. PATENT DOCUMENTS

| | | | | |
|---|---|---|---|---|
| 5,864,652 A | * | 1/1999 | Murahashi | ............ 358/1.16 |
| 2007/0154228 A1 | * | 7/2007 | Chan | ............ 399/12 |
| 2007/0223024 A1 | * | 9/2007 | Takesada | ............ 358/1.13 |
| 2008/0068638 A1 | | 3/2008 | Yagi | |
| 2009/0190162 A1 | | 7/2009 | Kohama et al. | |
| 2011/0037999 A1 | | 2/2011 | Sano | |
| 2012/0081731 A1 | | 4/2012 | Suzuki | |

FOREIGN PATENT DOCUMENTS

| | | |
|---|---|---|
| JP | 2002-297330 | 10/2002 |
| JP | 2008-097586 | 4/2008 |
| JP | 2012-078999 | 4/2012 |

OTHER PUBLICATIONS

Extended European Search Report dated Aug. 12, 2015.

* cited by examiner

*Primary Examiner* — Jerome Grant, II

(74) *Attorney, Agent, or Firm* — IPUSA, PLLC

(57) ABSTRACT

A data processing device including a first reception unit configured to receive data and store the data in a first storage unit; a process control unit configured to acquire the stored data and sequentially execute process units with respect to the acquired data; a second storage unit configured to store data corresponding to an execution result obtained up to one of the process units, when the one of the process units is suspended; and a moving unit configured to move the data stored in the second storage unit to the first storage unit in response to receiving a request to process the data stored in the second storage unit. The process control unit executes the process units from and beyond the suspended one of the process units, with respect to the data that has been moved from the second storage unit to the first storage unit.

14 Claims, 8 Drawing Sheets

FIG.7

| PLUG-IN ID | STATUS | OUTPUT INFORMATION | ... |
|---|---|---|---|
| A PROCESS | NOT EXECUTED | | |
| SUSPENSION PROCESS | NOT EXECUTED | | |
| PRINT DISTRIBUTION PROCESS | NOT EXECUTED | | |

FIG.9

| PLUG-IN ID | STATUS | OUTPUT INFORMATION | ... |
|---|---|---|---|
| A PROCESS | COMPLETED | ... | |
| SUSPENSION PROCESS | SUSPENDED | | |
| PRINT DISTRIBUTION PROCESS | NOT EXECUTED | | |

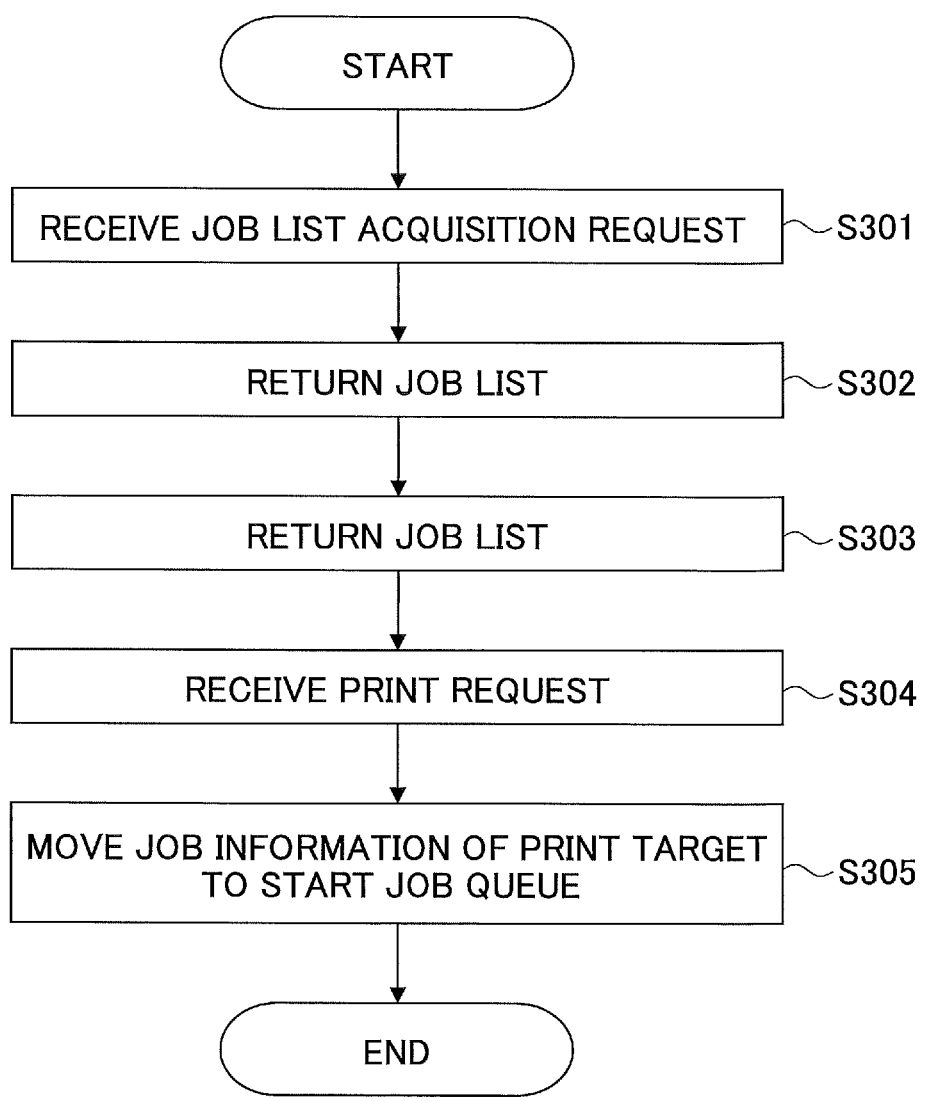

DATA PROCESSING DEVICE, DATA PROCESSING SYSTEM, AND DATA PROCESSING METHOD

BACKGROUND OF THE INVENTION

1. Field of the Invention

The present invention relates to a data processing device, a data processing system, and a data processing method.

2. Description of the Related Art

There is a system in which a workflow defined in advance can be executed, with respect to image data obtained by scanning a document in an image forming apparatus (see, for example, Patent Document 1). In this system, a workflow is defined such that the data flows in a mode in line with the business flow of the user.

Each workflow is basically constituted by a combination of process units, such as a process of inputting data, zero or more processing processes with respect to the input data, and a process of outputting data generated by executing the zero or more processing processes.

However, there are cases where it is not desirable that the process units constituting the workflow are executed continuously and automatically. For example, there may be cases where, in the middle of a workflow, input by the user is to be waited, and subsequent process units are to be executed according to the input by the user.

Patent Document 1: Japanese Laid-Open Patent Publication No. 2008-97586

Patent Document 2: Japanese Laid-Open Patent Publication No. 2012-078999

SUMMARY OF THE INVENTION

The present invention provides a data processing device, a data processing system, and a data processing method, in which one or more of the above-described disadvantages are eliminated.

According to an aspect of the present invention, there is provided a data processing device including a first reception unit configured to receive data and store the received data in a first storage unit; a process control unit configured to acquire the data stored in the first storage unit and sequentially execute one or more process units with respect to the acquired data; a second storage unit configured to store data corresponding to an execution result obtained up to one of the process units, when the one of the process units executed by the process control unit is suspended; and a moving unit configured to move the data stored in the second storage unit to the first storage unit in response to receiving a request to process the data stored in the second storage unit, wherein the process control unit executes the one or more process units from and beyond the one of the process units that has been suspended, with respect to the data that has been moved from the second storage unit to the first storage unit.

According to an aspect of the present invention, there is provided a data processing system including one or more computers, the data processing system including a first reception unit configured to receive data and store the received data in a first storage unit; a process control unit configured to acquire the data stored in the first storage unit and sequentially execute one or more process units with respect to the acquired data; a second storage unit configured to store data corresponding to an execution result obtained up to one of the process units, when the one of the process units executed by the process control unit is suspended; and a moving unit configured to move the data stored in the second storage unit to the first storage unit in response to receiving a request to process the data stored in the second storage unit, wherein the process control unit executes the one or more process units from and beyond the one of the process units that has been suspended, with respect to the data that has been moved from the second storage unit to the first storage unit.

According to an aspect of the present invention, there is provided a data processing method executed by one or more computers, the data processing method including receiving data and storing the received data in a first storage unit; implementing process control of acquiring the data stored in the first storage unit and sequentially executing one or more process units with respect to the acquired data; storing, in a second storage unit, data corresponding to an execution result obtained up to one of the process units, when the one of the process units executed at the process control is suspended; and moving the data stored in the second storage unit to the first storage unit in response to receiving a request to process the data stored in the second storage unit, wherein the implementing the process control includes executing the one or more process units from and beyond the one of the process units that has been suspended, with respect to the data that has been moved from the second storage unit to the first storage unit.

BRIEF DESCRIPTION OF THE DRAWINGS

Other objects, features and advantages of the present invention will become more apparent from the following detailed description when read in conjunction with the accompanying drawings, in which:

FIG. 7 illustrates a configuration example of progress information record data for a pull print flow;

FIG. 9 illustrates an example of a state of the progress information record data when the pull print flow is in a Pause state; and FIG. 10 is a flowchart of an example of processing procedures executed by the flow management server in response to operations to an image forming apparatus.

DETAILED DESCRIPTION OF THE PREFERRED EMBODIMENTS

Figure 1:
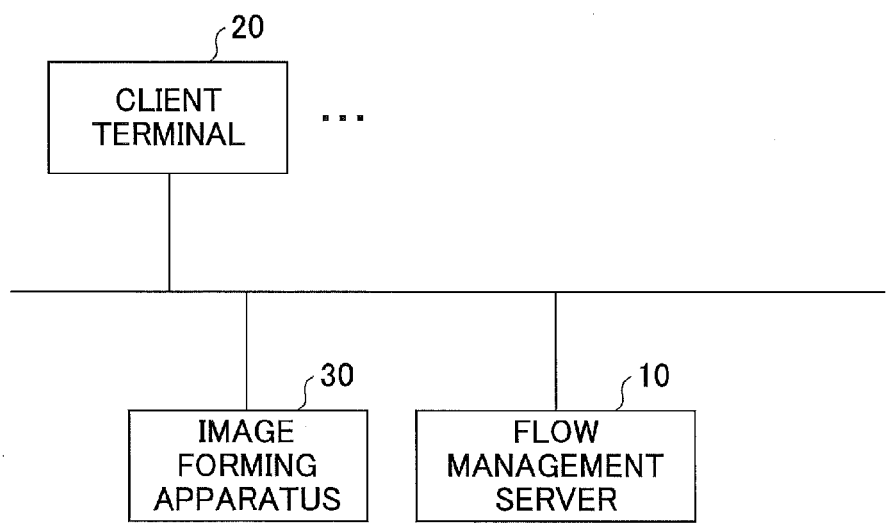
FIG. 1 illustrates a configuration example of an information processing system according to an embodiment of the present invention.

A description is given, with reference to the accompanying drawings, of embodiments of the present invention. FIG. 1 illustrates a configuration example of an information processing system according to an embodiment of the present invention. In FIG. 1, the information processing system 1 includes a flow management server 10, at least one client terminal 20, and at least one image forming apparatus 30. These devices are connected to each other such that communication is possible, via a network (wired or wireless) such as a LAN (Local Area Network) or the Internet.

The client terminal 20 is a terminal for sending, to the flow management server 10, the print data to be printed by the image forming apparatus 30. Examples of the client terminal 20 are a mobile phone, a smartphone, a tablet terminal, and a PC (Personal Computer).

The flow management server 10 is a computer for executing a workflow defined in advance, with respect to data that is received via the network. A workflow is, for example, a flow (process flow) of a process that is realized by an arbitrary combination of one or more process units (tasks), which realize a complete function separately or by itself. The workflow according to the present embodiment is constituted by a combination of, for example, an input process of data, a processing process of data, and an output process of data. For example, with respect to a workflow that is executed in response to the reception of print data, the reception of the print data corresponds to the input process of data, changing the setting information in the print data corresponds to the processing process of data, and sending the print data in which the setting information has been changed to the image forming apparatus 30 corresponds to the output process of data. Note that the above process unit may correspond to an activity, as a terminology of general workflows.

The image forming apparatus 30 is a device such as a printer or a multifunction peripheral for receiving the print data, and executing a print job based on the received print data.

Figure 2:
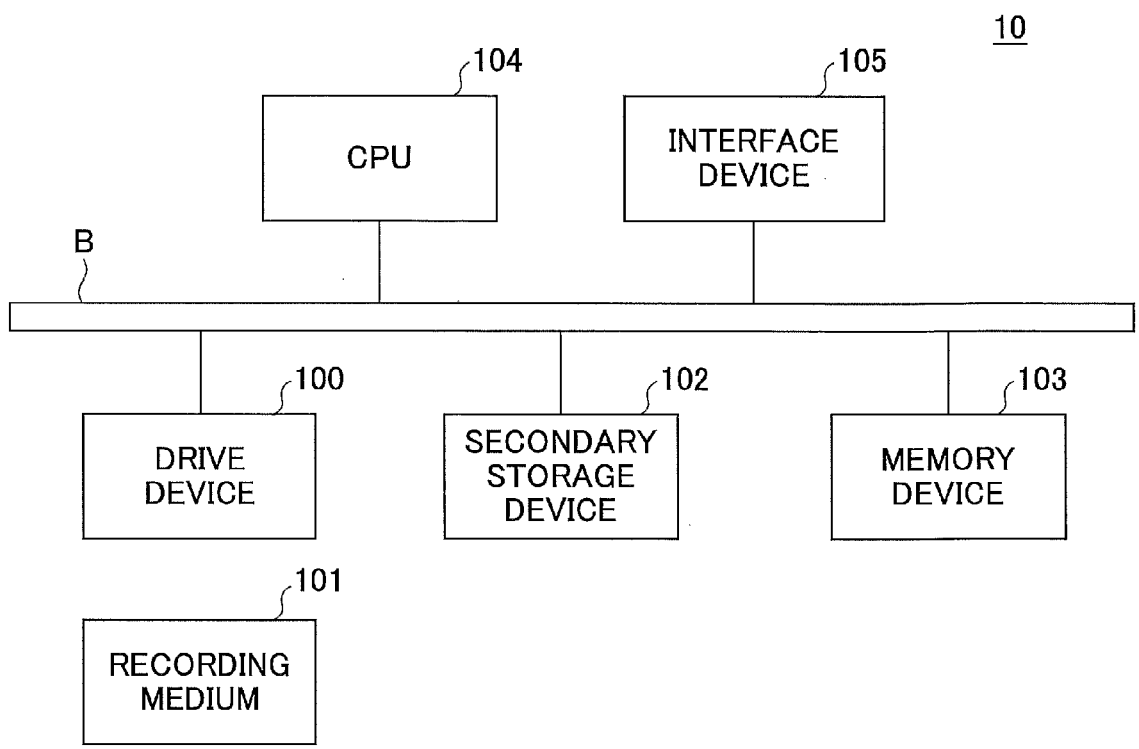
FIG. 2 illustrates a hardware configuration example of a flow management server according to an embodiment of the present invention.

FIG. 2 illustrates a hardware configuration example of the flow management server 10 according to an embodiment of the present invention. The flow management server 10 of FIG. 2 includes a drive device 100, a secondary storage device 102, a memory device 103, a CPU 104, and an interface device 105, which are interconnected by a bus B.

Programs realized by the processes at the flow management server 10 are provided by a recording medium 101 such as a CD-ROM. When the recording medium 101 storing a program is set in the drive device 100, the program is installed in the secondary storage device 102 from the recording medium 101 via the drive device 100. However, the programs do not necessarily need to be installed from the recording medium 101; the programs may be downloaded from another computer via the network. The secondary storage device 102 stores the installed programs, and stores necessary files and data.

The memory device 103 reads a program from the secondary storage device 102 and stores the program, when an instruction to activate the program is given. The CPU 104 executes a function relevant to the flow management server 10, according to program stored in the memory device 103. The interface device 105 is used as an interface for connecting to the network.

Note that the flow management server 10 may be a computer system including a plurality of computers.

In the present embodiment, a description is given of an example where pull printing is not realized by a system specialized for pull printing, but is realized by defining a workflow. Pull printing is a printing mode performed by the following procedures.

(1) The client terminal sends, to a predetermined server (hereinafter, "storage server"), the print data of document data, in response to an instruction to print the document data by the user.

(2) The storage server stores the print data in a storage device, instead of immediately sending the print data to the printing device. Therefore, as viewed from the user, the printing is not immediately executed in response to the print instruction.

(3) When the user wants to execute printing, the user inputs, in the printing device, an instruction to display list information of print data stored in the storage server. The print device acquires, from the storage server, a list of bibliographic information of the print data stored in the storage data, and displays the acquired list, in response to the display instruction.

(4) When the user selects bibliographic information to be the print target from the list, the printing device acquires the print data relevant to the bibliographic information from the storage server and executes a print job based on the print data.

As evident from the above, in pull printing, between the print instruction and the execution of the print job, there is an operation by the user such as selecting the print target. In order to make it possible to define and execute a workflow in which an operation by the user is allowed to be performed in the middle of the workflow, for example, the flow management server 10 has the functional configuration as illustrated in FIG. 3.

Figure 3:
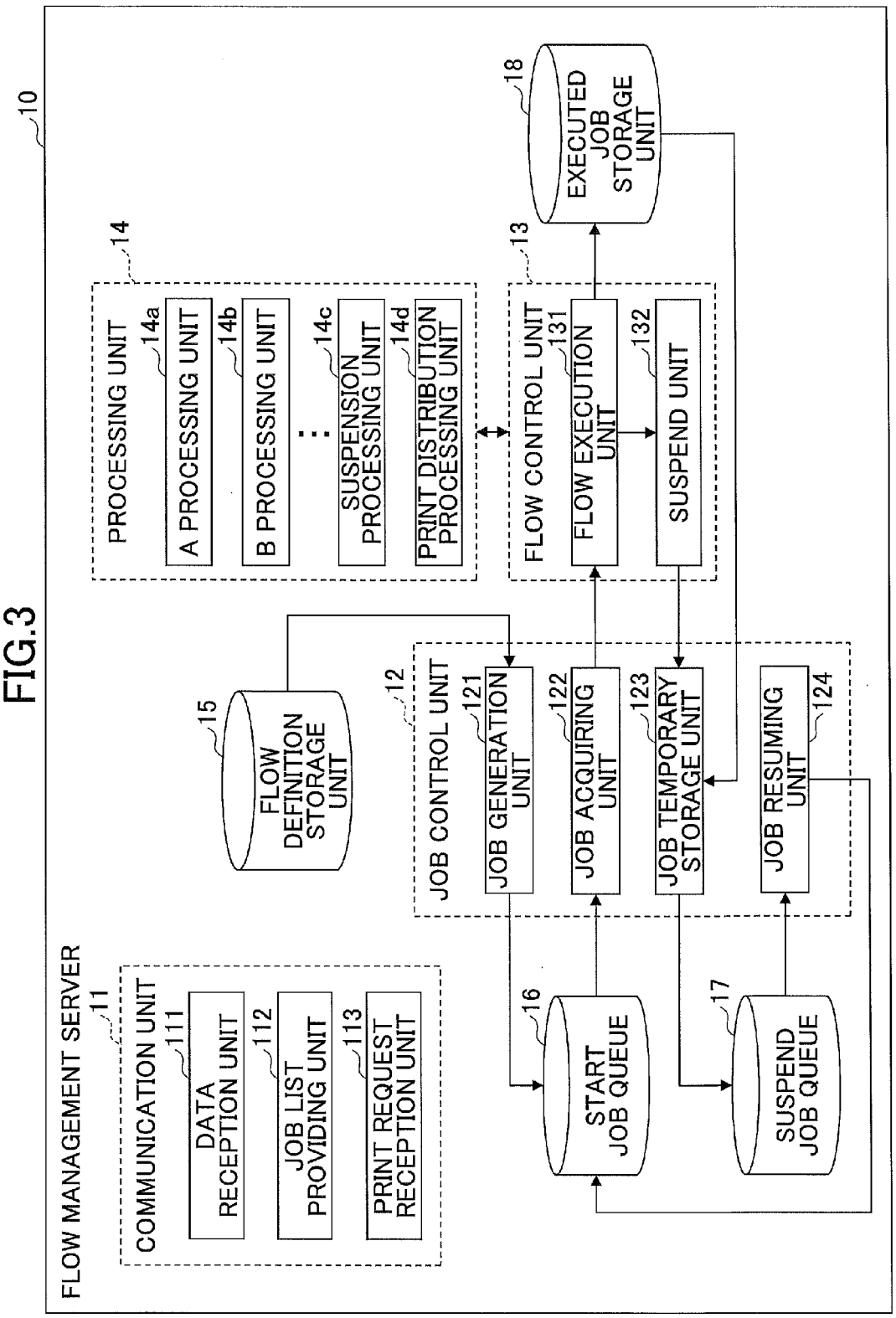
FIG. 3 illustrates a functional configuration of the flow management server according to an embodiment of the present invention.

FIG. 3 illustrates a functional configuration of the flow management server 10 according to an embodiment of the present invention. In FIG. 3, the flow management server 10 includes a communication unit 11, a job control unit 12, a flow control unit 13, and a processing unit 14. These units are realized by processes that the CPU 104 is caused to execute by one or more programs installed in the flow management server 10. Furthermore, the flow management server 10 uses storage units such as a flow definition storage unit 15, a start job queue 16, a suspend job queue 17, and an executed job storage unit 18. These storage units may be realized by the secondary storage device 102 or a storage device connected to the flow management server 10 via the network.

The communication unit 11 controls the communication with the client terminal 20 or the image forming apparatus 30. In FIG. 3, the communication unit 11 includes a data reception unit 111, a job list providing unit 112, and a print request reception unit 113.

The data reception unit 111 receives input data to a workflow. In the present embodiment, the data reception unit 111 receives input data from the client terminal 20. The job list providing unit 112 sends (returns), to the image forming apparatus 30, a list of job information stored in the suspend job queue 17 described below, in response to a request from the image forming apparatus 30. Job information is information generated in execution units of a workflow. In the following, an execution unit of a workflow is referred to as a "flow job". The print request reception unit 113 receives, from the image forming apparatus 30, a request to print data relevant to the job information selected by the user from the list of job information sent from the job list providing unit 112.

The job control unit 12 executes a process relevant to the job information of the flow job. In FIG. 3, the job control unit 12 includes a job generation unit 121, a job acquiring unit 122, a job temporary storage unit 123, and a job resuming unit 124.

The job generation unit 121 generates job information with respect to the data received by the data reception unit 111, and stores the generated job information in the start job queue 16. The start job queue 16 stores the job information of the flow job that is a start target or a resume target, in the format of, for example, FIFO (First-In First-Out).

One job information item includes process target data, flow definition data, and progress information recording data. The process target data is data that is the process target in a flow job. In the present embodiment, the process target data in the job information in the initial state is the print data received by the data reception unit 111. The initial state is a state before the workflow starts. The flow definition data is data in which the execution order of the process units constituting the workflow is defined, which is created for each workflow and stored in the flow definition storage unit 15. The job information includes the flow definition data of the workflow that is the execution target (hereinafter, "target flow") in the flow job relevant to the job information. In the present embodiment, when print data is received by the data reception unit 111, a fixed setting is made in the job generation unit 121 such that a particular workflow realizing pull printing (hereinafter, "pull print flow") is selected as the execution target. That is to say, when print data is received by the data reception unit 111, the job generation unit 121 acquires a copy of flow definition data relevant to the pull print flow from the flow definition storage unit 15, and includes the acquired copy in the job information. However, for example, the target flow may be dynamically determined, according to the value of a particular item constituting the bibliographic information included in the print data and a port where the print data has been received.

The progress information recording data is data in which information (hereinafter, "progress information") indicating the progress status of a flow job is recorded. For example, in the progress information recording data, a value of the status of each process flow constituting the target flow, is recorded. For example, as the values of the status, there are "unprocessed", "completed", "suspend", and "error". The value "unprocessed" is a state where the process unit is not yet executed. The value "completed" is a state where the process unit has been normally completed. The value "suspend" is a state where the process unit is suspended. A suspend state is a state where the process unit is temporarily stopped, and is in a standby state of waiting for a state where resume is possible or a state where the job is resumed. A value "error" is a state where the process unit has been abnormally ended.

Note that one job information item is managed by one folder, and the data items constituting the job information may be stored as files in the folder.

The job acquiring unit 122 periodically monitors the start job queue 16. When the job acquiring unit 122 detects that job information has been stored in the start job queue 16, the job acquiring unit 122 acquires the job information from the start job queue 16, and requests the flow control unit 13 to execute a workflow based on the job information. Note that the acquired job information is moved from the start job queue 16 to the executed job storage unit 18. That is to say, the acquired job information is deleted from the start job queue 16. The executed job storage unit 18 stores the job information of the flow job being executed.

When the flow job being executed is suspended (when the process unit constituting the target flow turns into a suspended state), the job temporary storage unit 123 moves the job information of the flow job from the executed job storage unit 18 to the suspend job queue 17.

When resuming the suspended flow job, the job resuming unit 124 moves the job information of the flow job, which is stored in the suspend job queue 17, to the start job queue 16.

The flow control unit 13 includes a flow execution unit 131 and a suspend unit 132. The flow control unit 13 determines the process unit to be the execution target based on flow definition data and progress information record data included in the job information stored in the executed job storage unit 18, and requests the processing unit 14 relevant to the process unit that is the execution target, to execute the process unit. When the processing unit 14 finishes executing the process unit, the flow execution unit 131 records information indicating that the process unit has been completed in the progress information record data, and determines the process unit to be executed next based on the flow definition data.

The suspend unit 132 reports the suspension of the flow job to the job temporary storage unit 123.

The processing unit 14 executes a process for each process unit constituting the workflow. For example, one process unit is executed by one processing unit 14. Therefore, a workflow is realized by a connection of process units by one or more processing units 14 having different process contents from each other. In FIG. 3, an A processing unit 14a, a B processing unit 14b, a suspension processing unit 14c, and a print distribution processing unit 14d are indicated as examples of the processing unit 14. The A processing unit 14a and the B processing unit 14b are simply examples. The suspension processing unit 14c is a processing unit 14 that realizes the suspending and the resuming of a flow job. The print distribution processing unit 14d is a processing unit 14 that causes the image forming apparatus 30 to execute a print job based on process target data, by sending the process target data included in the job information to the image forming apparatus 30. The respective processing units 14 may be realized by processes that the CPU 104 is caused to execute by separate program modules. A program module that causes the CPU 104 to function as a processing unit 14 is hereinafter referred to as a "plug-in".

Figure 4:
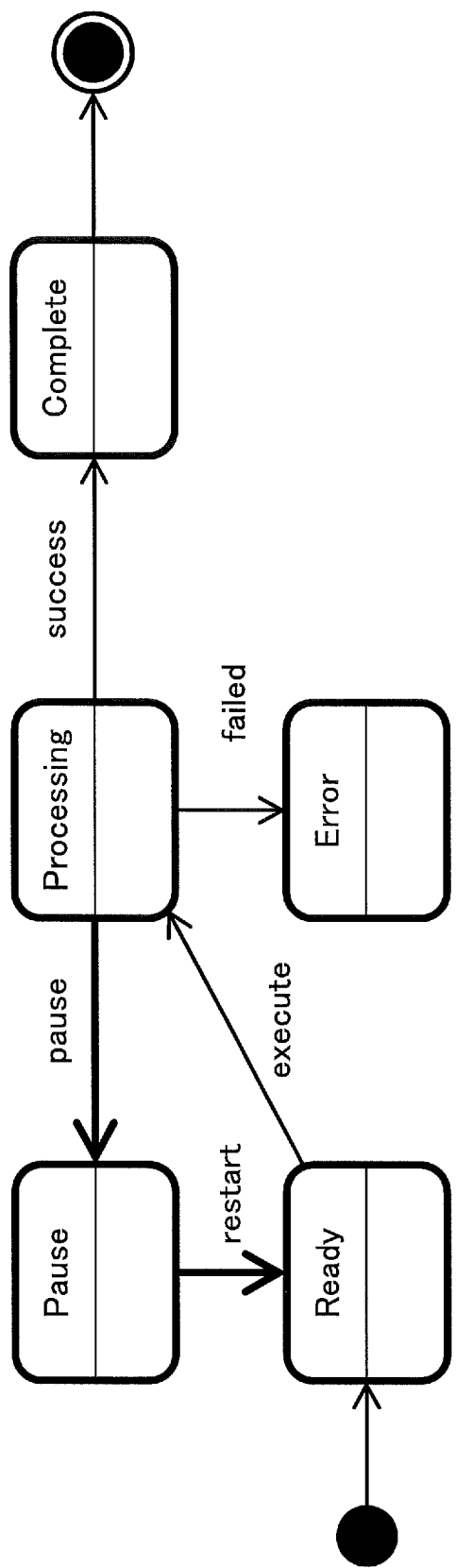
FIG. 4 illustrates an example of the state transition of a flow job according to an embodiment of the present invention.

As the flow management server 10 includes the functional configuration illustrated in FIG. 3, and as a process unit has a suspended state, the flow job according to the present embodiment implements state transition, for example, as illustrated in FIG. 4.

FIG. 4 illustrates an example of the state transition of a flow job according to an embodiment of the present invention.

The state transition of a flow job starts from a Ready state. The Ready state is a state in which the job information of the flow job is stored in the start job queue 16. When the job information is acquired from the start job queue 16 and the flow execution unit 131 starts to execute the flow job based on the job information, the flow job shifts to a Processing state. In the Processing state, the process units constituting the workflow relevant to the flow job are executed in an order according to the flow definition data. When all of the process units constituting the workflow are successfully executed, the flow job shifts to a Complete state and ends. Meanwhile, when the execution of any of the process units is unsuccessful, the flow job shifts to an Error state and ends.

Furthermore, when any of the process units constituting the workflow relevant to the flow job shifts to a suspended state, the flow job shifts to a Pause state. The Pause state is a state in which the job information of the flow job has been moved to the suspend job queue 17. When the job information that has been moved to the suspend job queue 17 is triggered to be moved to the start job queue 16 according to a predetermined event, the flow job shifts to the Ready state again. In response to the acquiring of the job information from the start job queue 16, the flow job shifts to the Processing state again.

Figure 5:
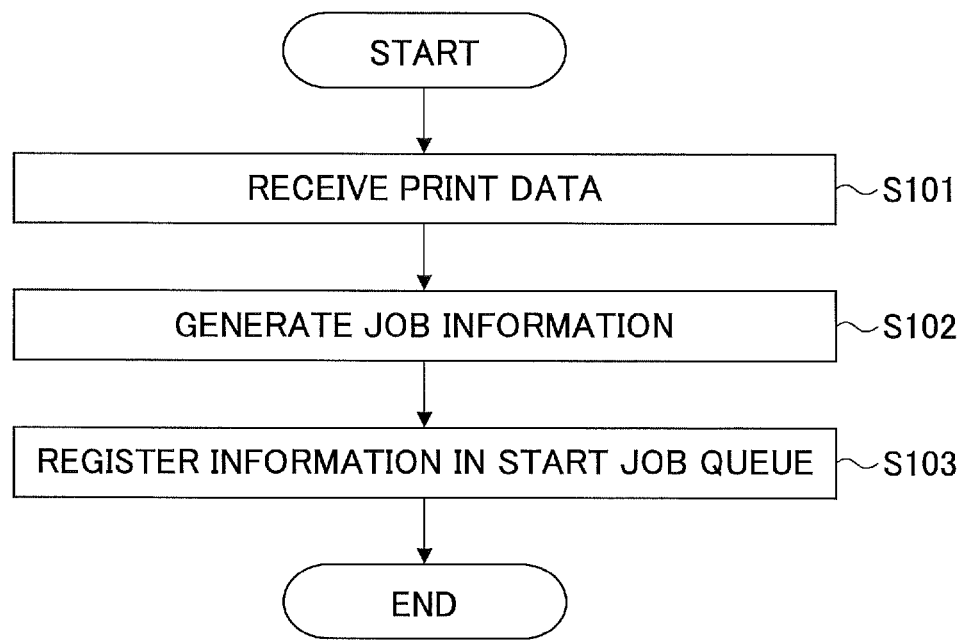
FIG. 5 is a flowchart of an example of processing procedures executed by the flow management server in response to receiving print data.

In the following, a description is given of processing procedures executed by the flow management server 10. FIG. 5 is a flowchart of an example of processing procedures executed by the flow management server 10 in response to receiving print data.

In step S101, the data reception unit 111 receives the print data sent from the client terminal 20. The print data is sent from the client terminal 20 based on, for example, a print instruction of document data input to the client terminal 20 by the user. Note that the print data is, for example, data described in PDL (Page Description Language), etc., generated by a printer driver in the client terminal 20. Note that together with the print data, the user name of the user who instructed the printing is also received. The user name may be included in the print data or may be received separately from the print data.

Next, the job generation unit 121 generates job information relevant to the received print data (step S102). Specifically, the job generation unit 121 acquires, from the flow definition storage unit 15, a copy of the flow definition data corresponding to the print data. In the present embodiment, the flow definition data of a pull print flow is acquired.

Figure 6:
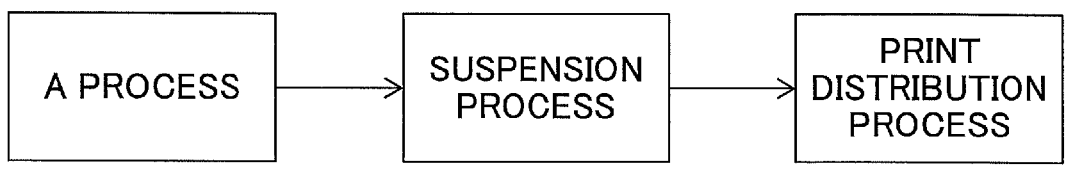
FIG. 6 conceptually illustrates the definition contents of a pull print flow.

FIG. 6 conceptually illustrates the definition contents of a pull print flow. FIG. 6 illustrates that the pull print flow is a workflow in which three process units of an A process, a suspension process, and a print distribution process are executed in the arrangement order as illustrated in FIG. 6. The A process is an example of a processing process, which is executed by the A processing unit 14a. In the present embodiment, the content of the A process is not limited to a particular content. For example, a process of forcibly changing the print setting may be the A process. An example of such a process is a process of changing color printing into monochrome printing in order to reduce print cost. The suspension process is executed by the suspension processing unit 14c. The print distribution process is an example of an output process, and is executed by the print distribution processing unit 14d.

Note that the flow definition data includes identification information of the plug-in (hereinafter, "plug-in ID") for causing the CPU 104 to function as processing units 14 for executing the respective process units. More specifically, the plug-in IDs are included in the flow definition data in an order corresponding to the execution order of the process units. The flow execution unit 131 is able to recognize the order of executing the process units based on the arrangement order of the plug-in IDs. In FIG. 6, as a matter of convenience, it is assumed that the character string ("A process", "suspension process", "print distribution process") inside each rectangle indicating a process unit is the plug-in ID.

Furthermore, the flow definition data may include setting information (parameters) with respect to each process unit. Note that the flow definition data may be described in, for example, an XML (eXtensible Markup Language) format.

The job generation unit 121 further generates progress information record data for a pull print flow, based on the flow definition data of the pull print flow.

FIG. 7 illustrates a configuration example of progress information record data for a pull print flow. In FIG. 7, in the progress information record data, it is possible to record the status, the output information, etc., for each process unit constituting the pull print flow. The status is the status of the process unit. In an initial state, the statuses of all of the process units are set as "not executed". The output information is, for example, a path name of a file storing data that is output as the execution result by the process unit. As described above, the configuration of the progress information record data depends on the configuration of the target flow. Therefore, the progress information record data is generated based on the flow definition data. For example, a copy of the flow definition data may be used as the progress information record data. That is to say, the status and output information of each process unit may be added to the copy of the flow definition data.

As described above, the job generation unit 121 generates job information including the received print data, flow definition data of the pull print flow, the generated progress information record data, and the user name received with respect to the print data. Furthermore, the job generation unit 121 generates a job ID that is identification information of each flow job and also includes the job ID in the job information.

Next, the job generation unit 121 registers the generated job information in the start job queue (step S103). As a result, the flow job relevant to the job information shifts to a Ready state.

Next, a description is given of processing procedures executed by the flow management server 10 with respect to the flow job that has shifted to the Ready state.

Figure 8:
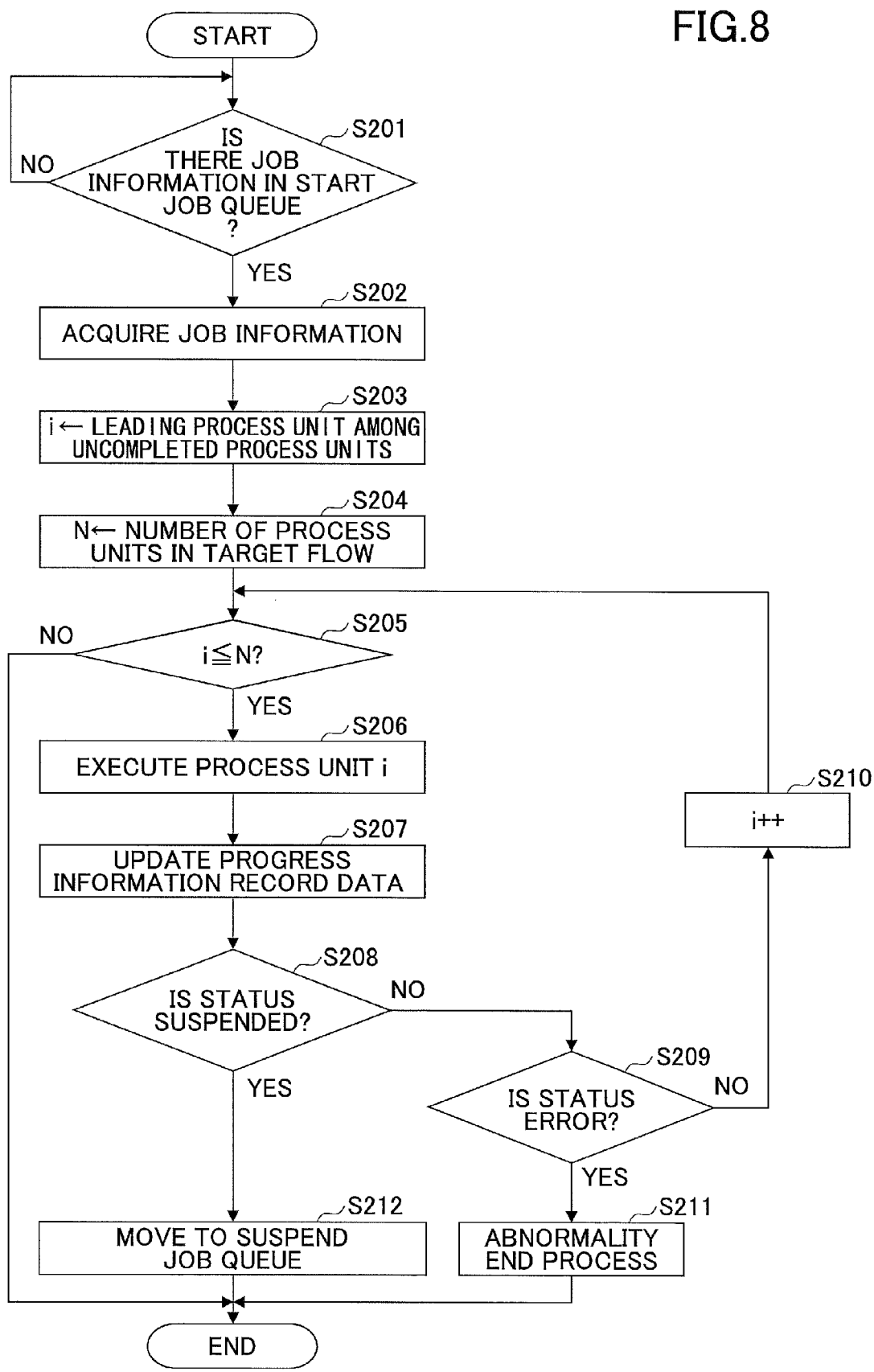
FIG. 8 is a flowchart of an example of processing procedures executed by the flow management server with respect to the flow job that has shifted to the Ready state.

FIG. 8 is a flowchart of an example of processing procedures executed by the flow management server 10 with respect to the flow job that has shifted to the Ready state.

For example, the job acquiring unit 122 periodically refers to the start job queue 16 (step S201). When job information is stored in the start job queue 16 (YES in step S201), the job acquiring unit 122 acquires the job information from the start job queue 16, and moves the job information to the executed job storage unit 18 (step S202). As a result, the flow job relevant to the job information shifts to a Processing state.

Next, the flow execution unit 131 identifies the process unit ranking first in the execution order among the process units that are not yet completed, based on the flow definition data and the progress information record data included in the job information stored in the executed job storage unit (step S203). Specifically, the process unit (plug-in) whose status is "not executed" or "suspended" is identified, based on the progress information record data. Among the identified process units, the process unit ranking first in the execution order is identified based on the flow definition data. Note that when it is possible to recognize the execution order of the process units based on the progress information record data, the process unit ranking first in the execution order among the process units that are not yet completed, may be identified based on only the progress information record data. The flow execution unit 131 assigns the execution rank order of the identified process unit in a variable i. Note that when step S203 is executed first with respect to the flow job that is the process target (hereinafter, "target flow job"), one is assigned in the variable i. In the following, the process unit that is executed at the "i"th rank order is referred to as a "process unit i".

Next, the flow execution unit 131 assigns the total number of process units constituting the workflow (target flow) relevant to the target flow job in a variable N (step S204). For example, in the case of the pull print flow of FIG. 6, three is assigned in N. Note that the total number of process units constituting the target flow may be identified based on the flow definition data of the target flow.

Next, the flow execution unit 131 determines whether the value of the variable i is less than or equal to the variable N (step S205). That is to say, the flow execution unit 131 determines whether there is an unprocessed process unit among the process units constituting the target flow.

When the value of the variable i is less than or equal to the variable N, that is to say, when there is an unprocessed process target (YES in step S205), the flow execution unit 131 causes the processing unit 14 corresponding to the process unit i to execute the process unit i (step S206). For example, the flow execution unit 131 requests the processing unit 14 to execute the process unit i. The request includes, for example, the path name of the process target data in the job information. The processing unit 14 executes the process unit i with respect to the process target data in response to the request, and returns, to the flow execution unit 131, the status and the output information of the processing unit 14. The status of the processing unit 14 is "completed", "suspended", or "error", according to the process result of the process unit.

Next, the flow execution unit 131 records the returned status and output information in the record corresponding to the process unit i of the progress information record data (step S207). Next, the flow execution unit 131 determines whether the returned status is "suspended" (step S208). When the returned status is not "suspended" (NO in step S208), the flow execution unit 131 determines whether the returned status is "error" (step S209). When the returned status is not "error" (NO in step S209), the flow execution unit 131 increments the variable i by one (step S210), and repeats step S205 and onwards. That is to say, when the returned status is "completed", the next process unit is executed.

Meanwhile, when the returned status is "error" (YES in step S209), the flow execution unit 131 executes a process that is performed when an abnormal ending occurs (step S211). For example, the job information of the target flow job is moved from the executed job storage unit 18 to an area storing job information of a flow job in which an error has occurred. When the process for an abnormal ending is completed, the target flow job ends.

Furthermore, when the returned status is "suspended" (YES in step S208), the suspend unit 132 moves the job information of the target flow job from the executed job storage unit 18 to the suspend job queue 17 (step S212). As a result, the target flow job shifts to a Pause state.

In the pull print flow according to the present embodiment, first, the A process is executed. When the status of the A process is "completed", a suspension process is executed. By the suspension process, a status indicating "suspended" is returned. As a result, the target flow job shifts to a Pause state. The progress information record data at this time point is, for example, as illustrated in FIG. 9.

FIG. 9 illustrates an example of a state of the progress information record data when the pull print flow is in a Pause state. In FIG. 9, the status of the A process is updated to "completed", and the status of the suspension process is updated to "suspended". Meanwhile, the status of the print distribution process remains to be "not executed".

Note that as the job information of the target flow job is moved to the suspend job queue 17 and the target flow job is suspended, the storage of the print data in the storage server is realized in the pull printing.

Subsequently, the user operates the image forming apparatus 30 at an arbitrary timing. Note that print instructions may be given for a plurality of documents, before the user operates the image forming apparatus 30. In this case, the processes of FIGS. 5 and 8 are executed with respect to the print data items of the respective documents. As a result, a plurality of job information items are stored in the suspend job queue 17.

Next, a description is given of processing procedures executed by the flow management server 10 in response to operations made to the image forming apparatus 30 by the user. FIG. 10 is a flowchart of an example of processing procedures executed by the flow management server 10 in response to operations to the image forming apparatus 30.

In step S301, the job list providing unit 112 receives a request to acquire a job list from the image forming apparatus 30. The acquisition request is sent from the image forming apparatus 30, according to an operation by the user who has logged into the image forming apparatus 30. The acquisition request includes the user name of the user.

Next, the job list providing unit 112 acquires a list (hereinafter, "job list") of bibliographic information of the job information including the user name included in the request to acquire the job list, among the job information items stored in the suspend job queue 17 (step S302). The bibliographic information of the job information is to include, for example, information by which the user can identify the print target in the job information, such as a document name of the process target data (print data) included in the job information, and the job ID.

Next, the job list providing unit 112 returns the job list (step S303). When the image forming apparatus 30 receives the job list, the image forming apparatus 30 causes the operation panel to display the job list. When the user selects one or more jobs from the job list and inputs a print instruction in the image forming apparatus 30, the image forming apparatus 30 sends, to the flow management server 10, the job ID of the selected job and a print request including the identification information of the image forming apparatus 30. The identification information of the image forming apparatus 30 is information needed for communicating with the image forming apparatus 30, such as an IP address. In the following, this identification information is referred to as a "device ID".

In step S304, the print request reception unit 113 receives the print request. The print request reception unit 113 reports, to the job resuming unit 124, the job ID and the device ID included in the received print request. The job resuming unit 124 moves the job information including the reported job ID from the suspend job queue 17 to the start job queue 16 (step S305). At this time, the job resuming unit 124 includes the device ID in the job information. The flow job relevant to the moved job information shifts to the Ready state again.

The job information that has been moved to the start job queue 16 becomes the processing target in the process illustrated in FIG. 8. For example, in the case of a pull print flow, in step S203, the value that is assigned in the variable i is "two", which is the execution rank order of the suspension process. In step S206, the flow execution unit 131 requests the suspension processing unit 14c to resume the process unit. The suspension processing unit 14c that has received the request to resume the process unit returns "completed" as the status. Note that in the present embodiment, the suspension processing unit 14c does not execute a processing process on the process target data, but the suspension processing unit 14c may perform a processing process on the process target data.

As the status of the suspension process is updated to "completed", the process target becomes the print distribution process. That is to say, in the next step S206, the flow execution unit 131 requests the print distribution processing unit 14d to execute the process unit. The print distribution processing unit 14d sends, to the image forming apparatus 30 relevant to the device ID included in the job information, the process target data (print data) included in the job information of the target flow job, in order to cause the image forming apparatus 30 to execute the print job of the process target data. As a result, pull printing is realized.

Note that as the print distribution process is completed, the value of the status of the progress information record data of the flow job of the pull print flow becomes "completed" for all process units. Therefore, the process of FIG. 8 is completed for the flow job.

As described above, according to the present embodiment, the flow job can be shifted to the Pause state. That is to say, the automatic progress of the flow job can be temporarily stopped. Furthermore, according to input by the user, the flow job in a Pause state can be resumed. Therefore, it is possible to enhance the flexibility of a process flow that is constituted by a combination of process units.

Note that in the present embodiment, the pull print flow is described as an example of a workflow that can be executed by using the suspension process; however, the suspension process may be incorporated with respect to another workflow. That is to say, the application range of the present embodiment is not limited to a pull print flow.

Furthermore, the data input to the workflow is not limited to print data. For example, the data reception unit 111 may receive image data obtained by a scanning operation by the image forming apparatus 30. Alternatively, the data reception unit 111 may receive an e-mail addressed to a predetermined mail address. Alternatively, the data reception unit 111 may perform polling on a folder of a predetermined computer such as a file server, and acquire a file stored in the folder as input data. Alternatively, the data reception unit 111 may receive input data via a web interface.

Note that in the present embodiment, the flow management server 10 is an example of a data processing device and a data processing system. The start job queue 16 is an example of a first storage unit. The data reception unit 111 is an example of a first reception unit. The job acquiring unit 122 and the flow execution unit 131 are examples of a process control unit. The suspend job queue 17 is an example of a second storage unit. The job resuming unit 124 is an example of a moving unit. The job list providing unit 112 is an example of a sending unit. The print request reception unit 113 is an example of a second receiving unit.

According to one embodiment of the present invention, a data processing device, a data processing system, and a data processing method are provided, which are capable of enhancing the flexibility in the process flow constituted by a combination of process units.

The data processing device, the data processing system, and the data processing method are not limited to the specific embodiments described herein, and variations and modifications may be made without departing from the spirit and scope of the present invention.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present application is based on and claims the benefit of priority of Japanese Priority Patent Application No. 2014-027113, filed on Feb. 17, 2014, the entire contents of which are hereby incorporated herein by reference.

What is claimed is:

1. A data processing device comprising:
a memory configured to store a program; and
a processor configured to execute the program to perform a process including
receiving and storing data in a first storage;
acquiring the data stored in the first storage and sequentially executing one or a plurality of process units with respect to the acquired data;
storing data corresponding to an execution result obtained up to one of the plurality of process units, when the one of the plurality of process units executed by the acquiring is suspended;
moving the data stored in the second storage to the first storage in response to receiving a request to process the data stored in the second storage;
sending list information of the data stored in the second storage to another device that is coupled to the data processing device via a network; and
receiving, from the other device, information indicating a data item selected from the list information, wherein
the acquiring executes the one or the plurality of process units from and beyond the one of the plurality of process units that has been suspended, with respect to the data moved from the second storage to the first storage, and
the moving moves the data item indicated by the information received by the receiving, from the second storage to the first storage.

2. The data processing device according to claim 1, wherein
the one or the plurality of process units are executed by one or a plurality of processing units that are formed by the processor and execute mutually different process units, wherein
the acquiring includes
acquiring the data stored in the first storage,
requesting the one or the plurality of processing units relevant to the one or the plurality of process units that are to be executed with respect to the acquired data, to execute the one or the plurality of process units that are to be executed with respect to the acquired data, and
storing, in the second storage, the data corresponding to the execution result obtained up to the one of the plurality of process units, in response to a suspension request from the one of the plurality of process units.

3. The data processing device according to claim 1, wherein
the receiving and storing receives the data that is a print target,
the sending sends the list information to a printing device coupled to the data processing device via the network, and
the acquiring executes one of the plurality of process units of to send, to the printing device, the data moved from the second storage to the first storage by the moving.

4. The data processing device as claimed in claim 1, wherein
the first storage stores a start job queue of job information of a flow job that is a start target or a resume target, and the second storage stores a suspend job queue of job information of a flow job that is suspended.

5. A data processing system including one or a plurality of computers, the data processing system comprising:
a memory configured to store a program; and
a processor configured to execute the program to perform a process including
receiving and storing data in a first storage;
acquiring the data stored in the first storage and sequentially executing one or a plurality of process units with respect to the acquired data;
storing data corresponding to an execution result obtained up to one of the plurality of process units, when the one of the plurality of process units executed by the acquiring is suspended;
moving the data stored in the second storage to the first storage in response to receiving a request to process the data stored in the second storage;
sending list information of the data stored in the second storage to another device coupled to the processor via a network; and
receiving, from the other device, information indicating a data item selected from the list information, wherein
the acquiring executes the one or the plurality of process units from and beyond the one of the plurality of process units that has been suspended, with respect to the data moved from the second storage to the first storage, and
the moving moves the data item indicated by the information received by the receiving, from the second storage to the first storage.

6. The data processing system according to claim 5, wherein
the one or the plurality of process units are executed by one or a plurality of processing units that are formed by the processor and execute mutually different process units, wherein
the acquiring includes
acquiring the data stored in the first storage,
requesting the one or the plurality of processing units relevant to the one or the plurality of process units that are to be executed with respect to the acquired data, to execute the one or the plurality of process units that are to be executed with respect to the acquired data, and
storing, in the second storage, the data corresponding to the execution result obtained up to the one of the plurality of process units, in response to a suspension request from the one of the plurality of process units.

7. The data processing system according to claim 5, wherein
the receiving and storing receives the data that is a print target,
the sending sends the list information to a printing device coupled to the processor via the network, and
the acquiring executes one of the plurality of process units of to send, to the printing device, the data moved from the second storage to the first storage by the moving.

8. The data processing system according to claim 5, comprising:
the plurality of computers communicable with each other, wherein
one of the plurality of computers includes the processor.

9. The data processing system as claimed in claim 5, wherein
the first storage stores a start job queue of job information of a flow job that is a start target or a resume target, and
the second storage stores a suspend job queue of job information of a flow job that is suspended.

10. A data processing method comprising:
receiving and storing, by a processor, data in a first storage;
acquiring, by the processor, the data stored in the first storage and sequentially executing one or a plurality of process units with respect to the acquired data;
storing in a second storage by the processor, data corresponding to an execution result obtained up to one of the plurality of process units, when the one of the plurality of process units executed by the acquiring is suspended;
moving, by the processor, the data stored in the second storage to the first storage in response to receiving a request to process the data stored in the second storage;
sending, by the processor, list information of the data stored in the second storage to a device connected via a network; and
receiving, from the device by the processor, information indicating a data item selected from the list information, wherein
the acquiring includes executing the one or the plurality of process units from and beyond the one of the plurality of process units that has been suspended, with respect to the data moved from the second storage to the first storage, and
the moving includes moving the data item indicated by the information received by the receiving, from the second storage to the first storage.

11. The data processing method according to claim 10, further comprising:
executing, by one or a plurality of processing units, the one or the plurality process units that are mutually different, wherein
the acquiring includes
acquiring the data stored in the first storage,
requesting the one or the plurality of processing units relevant to the one or the plurality of process units that are to be executed with respect to the acquired data, to execute the one or the plurality of process units that are to be executed with respect to the acquired data, and
storing, in the second storage, the data corresponding to the execution result obtained up to the one of the plurality of process units, in response to a suspension request from the one of the plurality of process units.

12. The data processing method according to claim 10, wherein
the receiving includes receiving the data that is a print target,
the sending includes sending the list information to a printing device coupled to the processor via the network, and
the acquiring includes executing one of the plurality of process units to send, to the printing device, the data moved from the second storage to the first storage by the moving.

13. The data processing method according to claim 10, wherein the processor is included in one of a plurality of computers that are communicable with each other.

14. The data processing method as claimed in claim 10, wherein
the first storage stores a start job queue of job information of a flow job that is a start target or a resume target, and
the second storage stores a suspend job queue of job information of a flow job that is suspended.

* * * * *